UNITED STATES PATENT OFFICE.

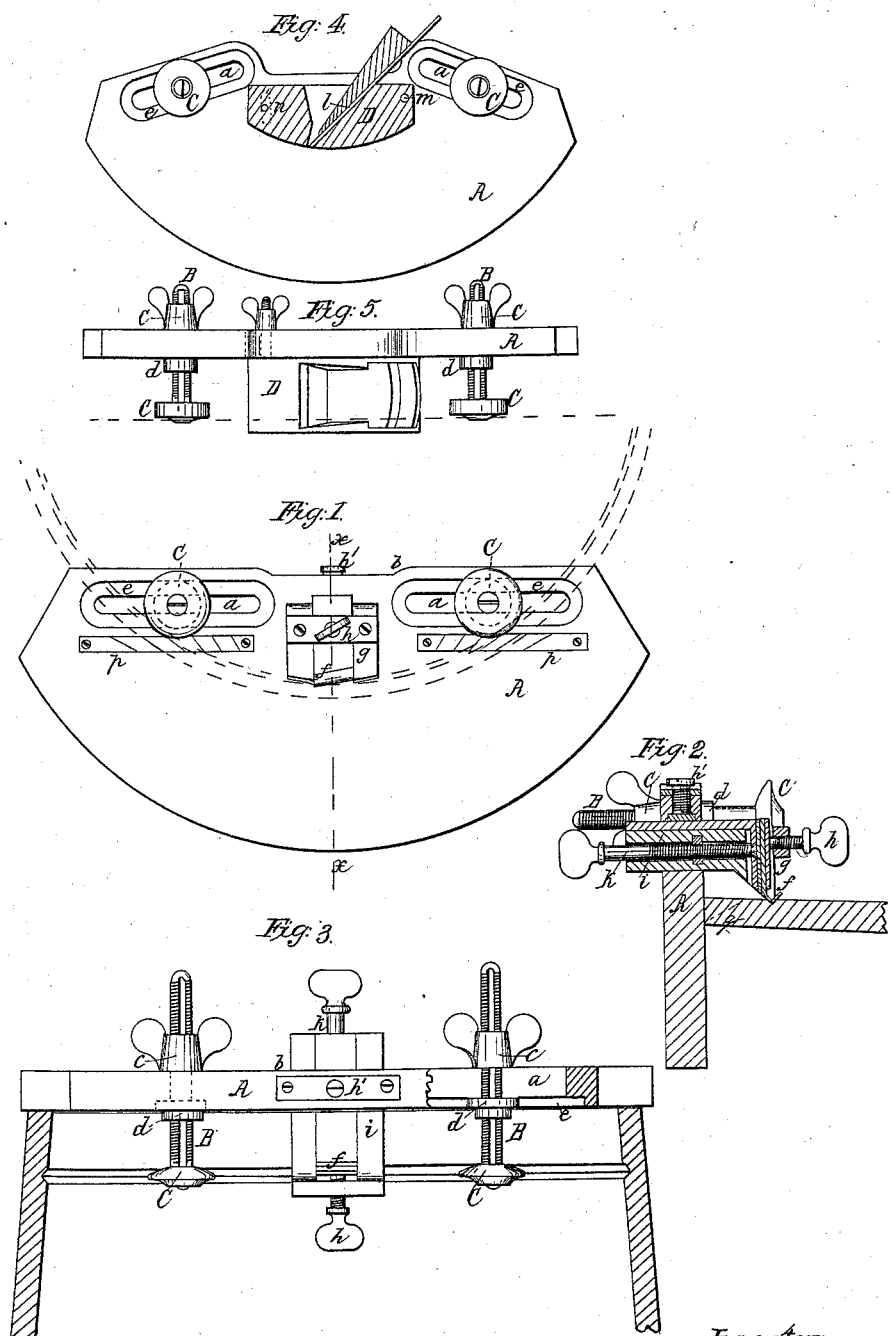

HENRY MARTIN, OF LOUISVILLE, KENTUCKY.

TOOL FOR CROZING AND CHAMFERING BARRELS.

Specification of Letters Patent No. 22,813, dated February 1, 1859.

*To all whom it may concern:*

Be it known that I, HENRY MARTIN, of Louisville, in the county of Jefferson and State of Kentucky, have invented a new and Improved Implement or Tool for Coopers designed for Crozing and Chamfering Casks; and I do hereby declare that the following is a full, clear, and exact description of the same, reference being had to the annexed drawings, making a part of this specification, in which—

Figure 1, is a face view of my invention applied to its work and having a crozing cutter attached. Fig. 2, a transverse section of the same, taken in the line $x$, $x$, Fig. 1. Fig. 3, an end or edge view of the same, a portion being broken away or removed. Fig. 4, a face view of the same, with a chamfer tool attached, the latter being bisected. Fig. 5, an end or edge view of the same.

Similar letters of reference indicate corresponding parts in the several figures.

This invention consists in the employment or use of a stock or gage constructed or arranged in a novel way, as hereinafter fully shown and described, so as to admit of the attachment of either a crozing or chamfer tool or a trowel and whereby one and the same stock is rendered capable of being applied to casks of various dimensions, including hogsheads, barrels, kegs, etc.

To enable those skilled in the art to fully understand and construct my invention I will proceed to describe it.

A, represents a stock or gage which is formed of a piece of plank cut in segment form, such form being the most convenient, and having two slots $a$, $a$, made through it near its straight edge $b$, both of which are shown clearly in Figs. 1 and 4. The plank may be of any suitable thickness and a compact or close grain wood would probably be the most preferable material, metal being rather too heavy and cumbersome although it might be used.

Through each slot $a$, a screw B, passes, and a thumb nut $c$, is fitted on the upper part of each screw, the thumb nuts being above the stock A. On each screw below the stock A, a jaw nut $d$, is placed, the latter being fitted in recesses $e$, which surround the slots $a$, see Fig. 3. The screws B, are prevented from turning in the slots $a$, $a$, by having two plane surfaces formed at opposite sides, the plane surfaces being in contact with the sides of the grooves.

On the lower end of each screw B, B, a roller C, is placed. These rollers may have flat or V-shaped peripheries. In Figs. 2 and 3, the rollers are shown as having V-shaped peripheries and flat peripheries in Fig. 5.

In Figs. 1, 2 and 3, a crozing tool $f$ is shown attached to the stock. This tool is of V-shape or so formed as to cut a V-shaped groove or crease technically termed a "croze" and which receives the edge of the head of the cask. This crozing tool $f$, is fitted in a box $g$, and it may be adjusted therein longitudinally to give it more or less feed or rake and is secured by a set screw $h$, at the desired point. The box $g$, is attached to a slide $i$, which passes through the stock A, and may be adjusted in the stock by a screw $h'$. The box $h$, is also rendered capable of an independent adjustment by a screw $k$.

In order to cut a croze in a cask the slide $i$, is adjusted in the stock A, so as to cut the croze at the desired distance from the end of the barrel or cask, the face side of the stock bearing against the edge of the barrel or cask. The rollers C, C, are also adjusted accordingly, that is to say, the rollers C, are adjusted so as to be in the same plane with the crozing tool $f$, and the screws B, are adjusted in the slots $a$, $a$, of the stock so as to be nearer to or farther from each other according to the inner diameter of the cask. The rollers C, C, form the bearing or guide for the stock and work against the inner side of the cask. In casks of large diameter the rollers require to be a considerable distance apart, in order to bear against it, and they are brought nearer together for casks of smaller diameter. This will be clearly understood by referring to Fig. 1, the cask in this as in Figs. 2 and 3, being shown in red. To cut or chamfer the chime of a cask, the slide $i$, is removed and a chamfer tool or cutter D, attached as shown in Figs. 4 and 5.

The tool D, is simply a small plane having a convex rim $l$, and a sole, a transverse section of which is also convex, as well as a longitudinal section. The plane D, may be attached to the face side of the stock A, in any proper manner. A certain degree of adjustment is necessary, and therefore one end of the plane may be attached to the stock by a screw $m$, and the opposite end may be secured by a screw $n$, passing through a curved slot $o$, in the stock and having a thumb nut $n'$ placed thereon. The rollers C, C, are adjusted as before and graduated scales $p$, may be fitted in the face side of the stock A, in order to facilitate the adjustment of the rollers according to the size of the cask to be operated on. The chamfer cut by the tool D, is indicated by the dotted line $q$, in Fig. 2.

I would remark that the slots $a$, $a$, may be either parallel with the straight edge $b$, as shown in Fig. 1, or have an oblique position with it as shown in Fig. 1.

I would remark that a trowel may also be attached to the stock. This trowel may be similar to the plane and so arranged as to perform its usual work, to wit, smooth the surface at the inner side of the cask where the croze is to be cut.

Having thus described my invention what I claim as new and desire to secure by Letters Patent, is,

The stock A, provided with the rollers C, C, arranged so as to be capable of being adjusted longitudinally and laterally in the stock, substantially as and for the purpose set forth.

HENRY MARTIN.

Witnesses:
ROBERT A. HAMILTON,
A. McBRIDE.